United States Patent [19]

Froberg

[11] 3,979,197
[45] Sept. 7, 1976

[54] METHOD OF OPERATING GLASS MELTING FURNACE
[75] Inventor: Magnus L. Froberg, Granville, Ohio
[73] Assignee: Owens-Corning Fiberglas Corporation, Toledo, Ohio
[22] Filed: May 1, 1975
[21] Appl. No.: 573,700

Related U.S. Application Data
[63] Continuation of Ser. No. 458,142, April 5, 1974, abandoned.

[52] U.S. Cl. .................................... 65/135; 13/6; 65/136; 65/DIG. 4
[51] Int. Cl.² ................................... C03B 5/16
[58] Field of Search ............... 65/DIG. 4, 134, 135, 65/136, 335; 13/6

[56] References Cited
UNITED STATES PATENTS

| | | | |
|---|---|---|---|
| 1,794,863 | 3/1931 | Northrup | 65/DIG. 4 |
| 2,440,187 | 4/1948 | Silverberg | 65/DIG. 4 |
| 2,863,932 | 12/1958 | Gell et al. | 65/335 X |
| 3,486,874 | 12/1969 | Rough | 65/335 X |

Primary Examiner—Robert L. Lindsay, Jr.
Attorney, Agent, or Firm—John W. Overman; Ronald C. Hudgens; Greg Dziegielewski

[57] ABSTRACT

An electrically-heated, glass-melting furnace has an infrared-absorbing material located along the side walls to intercept energy from the heat source in the pool of molten glass in the furnace and thereby enable the side walls to be at a lower temperature. The furnace is heated electrically by means of electrodes immersed in the molten glass and with this arrangement, the glass and the side walls of the furnace tend to be at higher temperatures than furnaces utilizing fuel-fired burners firing above the molten glass. The higher wall temperatures result in a shorter life for the furnace, requiring more frequent, costly rebuilding. To overcome this, a material capable of absorbing infrared rays is supplied to the furnace along the side walls thereof. This material forms a curtain disposed between the side walls and the heat source to intercept the infrared rays and thereby reduce the operating temperatures of the side walls. The absorbing material eventually becomes mixed with the molten glass in the furnace and is discharged therewith. However, the material constitutes such a small percentage of the overall discharged glass that it has no significant effect upon the characteristics thereof.

14 Claims, 6 Drawing Figures

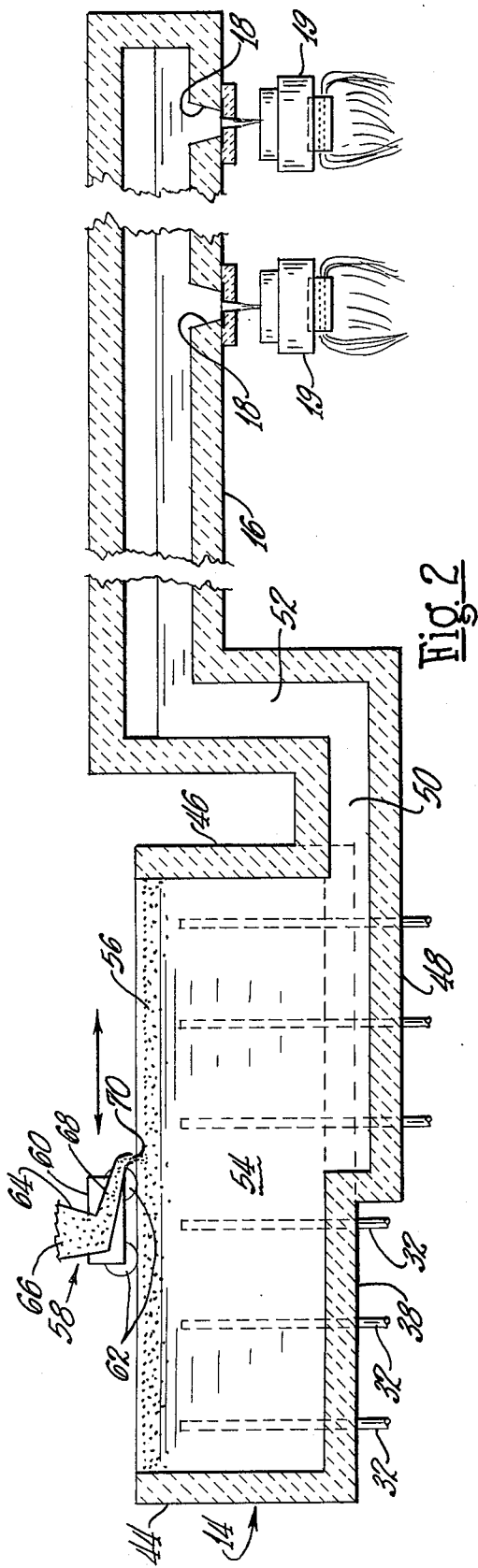

METHOD OF OPERATING GLASS MELTING FURNACE

This is a continuation of application Ser. No. 458,142, filed Apr. 5, 1974 now abandoned.

This invention relates to an electrically-heated, melting furnace having walls operating at lower temperatures than heretofore.

The electric heating of glass melting furnaces is becoming more common as the awareness of pollution increases, since such furnaces substantially eliminate pollution at the glass melting site. Such furnaces are particularly advantageous when the electric power is generated by coal or nuclear power rather than relatively scarce gas or oil. The electrical heating also has other advantages, including the production of higher quality glass and the achievement of a higher degree of melting efficiency. The final glass composition discharged from the furnace can also be controlled more accurately in many instances.

Glass melting furnaces heated electrically commonly have the electrodes projecting into a tank of the furnace from the bottom thereof, with the electrodes being immersed in the molten glass in the tank. Glass batch is added over the surface of the molten glass to form a continual supply of glass batch and at the same time to serve as an insulating layer or crust thereon. Both the glass and the walls of the tanks of electric furnaces of this type tend to operate at higher temperatures than conventional fuel-fired glass melting furnaces in which the burners fire above the molten glass. The higher operating temperatures result in a significantly shorter life of the tank walls of the furnace, requiring more frequent shut-downs for rebuilding and correspondingly higher costs. Some attempts have been made to cool the refractory walls from the outer surfaces by the use of air or water but this adds to the operating costs of the furnace and renders it less efficient by increasing heat losses from the tank.

In accordance with the present invention, a material or compound capable of absorbing infrared rays is added to the tank of an electrically-heated, glass-melting furnace between the heat source and the side walls thereof, and specifically contiguous with the side walls to absorb infrared rays and thereby maintain the walls at lower temperatures. The material, such as an iron compound, can be added to the portions of the glass batch supplied to the furnace adjacent the side walls or can be added separately to the batch layer on top of the molten glass near the side walls. The absorbing compound can also be added to glass cullet supplied near the side walls, by way of further example. An iron oxide is an effective compound for the purpose since it is effective to absorb the infrared rays when constituting even less than one percent of the batch added adjacent the side walls, with the final iron oxide in the glass discharged from the tank being minute and having no effect at all on the characteristics of the glass. Furnace wall life up to at least twice that now occurring is possible with the use of the invention.

It is, therefore, a principal object of the invention to achieve a longer life for an electrically-heated, glass-melting furnace.

Another object of the invention is to operate tank walls of an electrically-heated, glass-melting furnace at lower temperatures by supplying an infrared ray absorbing compound adjacent the tank walls.

A further object of the invention is to provide an electrically-heated, glass-melting furnace which operates with cooler tank walls and without significantly changing the characteristics of the glass discharged from the furnace.

Many other objects and advantages of the invention will be apparent from the following detailed description of preferred embodiments thereof, reference being made to the accompanying drawings, in which:

FIG. 2 is a schematic, fragmentary view in longitudinal section taken through the furnace of FIG. 1;

FIG. 3 is a schematic, fragmentary, plan view of the furnace of FIG. 2, without glass therein;

Figure 1:
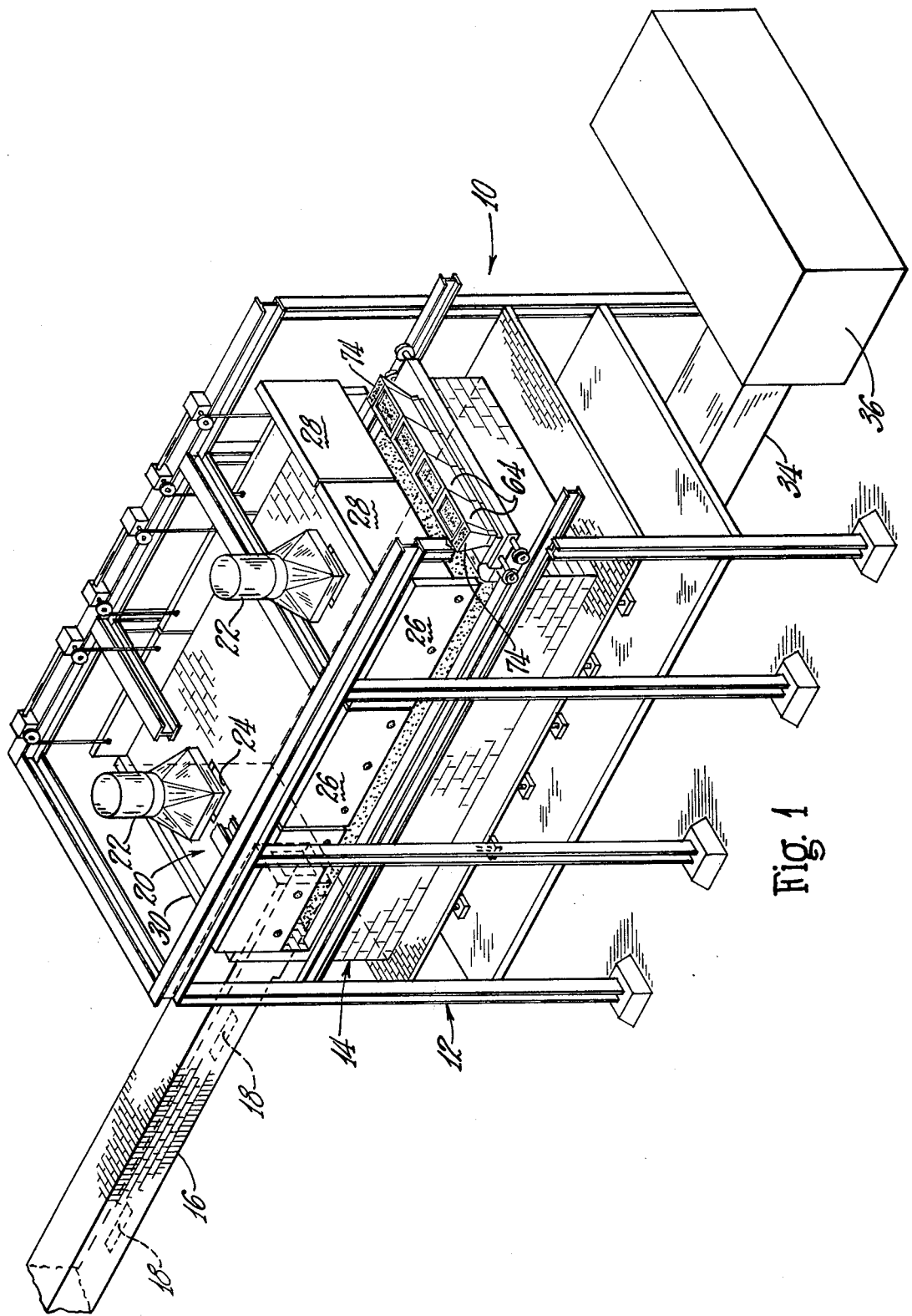
FIG. 1 is a somewhat schematic view in perspective of a glass melting furnace embodying the present invention.
Figure 4:
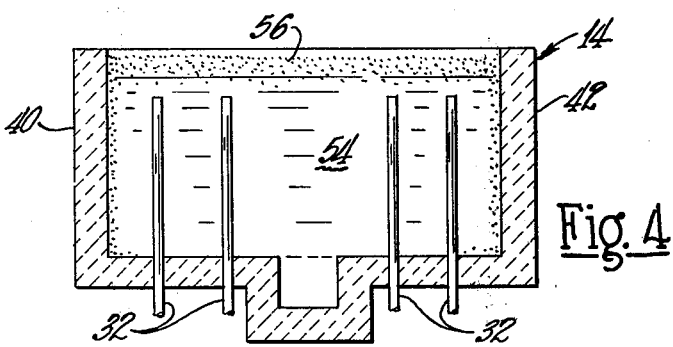
FIG. 4 is a schematic view in transverse cross section taken through the furnace of FIGS. 1–3.

Referring particularly to FIG. 1, an overall glass-melting furnace embodying the invention is indicated at 10 and is shown in a typical embodiment, being supported by a framework 12 in a multi-story building (not shown). The furnace includes a melting tank 14 which, in this instance, supplies molten glass to a forehearth 16 from which glass can be supplied through openings 18 to bushings 19 (FIG. 2) located therebelow, and from which glass filaments are formed. A dome or roof structure 20 is supported above the tank 14 with exhaust ducts 22 communicating with openings 24 in the roof. Movable upper side and end walls 26 and 28 extend between the tank 14 and the roof structure 20 to form a partial enclosure for the tank, along with an upper end wall 30 at the discharge end, which may or may not be movable.

After a pool of molten glass has been initially established in the tank 14 by heat supplied from burners firing above the tank, subsequent heating is accomplished through a plurality of electrodes 32 (FIGS. 2 and 3) which extend upwardly into the molten glass in the tank from a lower level. The electrodes 32 are suitably positioned throughout the tank in a desired pattern according to the needs of the particular tank, as is known in the electric furnace art. The portions of the electrodes 32 exposed below the tank 14 can be protected by suitable sleeves thereon containing inert gas, and the electrodes can also be water cooled, if desired, as is also known. Power is supplied to the electrodes 32 through leads located in a duct 34 (FIG. 1) connected with a power source in a housing 36.

The melting tank 14 is made of suitable refractory material and includes a bottom 38 (FIGS. 2 and 3), side walls 40 and 42, a forward end wall 44, and a discharge end wall 46. A discharge trough 40 can be formed in the bottom 38 to direct the molten glass from the tank 14 through a throat 50 and a riser 52 to the forehearth 16.

Molten glass 54 in the tank 14 is replenished by a layer 56 of batch deposited by a batch distributor 58. The distributor 58 is shown and discussed in more detail in U.S. Pat. No. 3,877,917, of Charles M. Hohman, entitled "Batch Feeder for Glass Furnaces". Basically, the distributor 58 includes a carriage 60 having wheels 62 and carrying a plurality of hoppers 64. Batch 66 in the hoppers 64 is discharged through chutes 68 terminating in suitable discharge spouts 70. Flow of the batch 66 from the hoppers 64 to the discharge spouts 70 can be aided by a vibratory action, if desired. The distributor 58 spreads the batch 66 on the layer 56 at a rate substantially equal to the discharge rate of the glass from the furnace. The batch layer 66 forms an insulating layer over the molten glass 54 and since the electrodes 32 are immersed in the glass 54, the molten glass in the tank 14 and the walls thereof are at a higher temperature than the glass and walls of glass melting tanks employing fuel-fired burners above the molten glass. Typically, the temperature of the molten glass 54 and the tank walls will exceed 2500°F. in at least some portions of the furnace.

Attempts have been made heretofore to cool the tank walls externally as by means of air jets directed at the outer surface or by means of water-cooled pipes. While these have had some benefit on tank wall life, they also increase the heat loss from the furnace and correspondingly reduce the efficiency thereof.

In accordance with the invention, an infrared ray absorbing material or compound 72 is disposed along the walls and particularly the side walls 40 and 42 of the furnace. This compound forms a curtain which intercepts infrared rays from the electrodes 32 in the molten glass being directed toward the inner surfaces of the side walls, and thereby enables the side walls to operate at lower temperatures. The infrared ray absorbing compound can be deposited along the edges of the batch layer 56 and carried downwardly by the natural convection currents in the furnace, these currents flowing downwardly along the side walls as shown by the arrows in FIG. 5. As the compound 72 reaches the bottom 38 of the tank 14 it mixes with the molten glass 54 by virtue of the convection currents along the electrode 32 and eventually flows through the trough 48 and is discharged. By this time, the compound is so thoroughly diluted that it has no effect upon the physical characteristics of the discharged glass whatsoever. Further, the energy or heat absorbed by the compound is not lost but is carried through the tank. However, it is calculated that the compound can reduce the operating temperature of the side walls by 50° to 75°C. or more and it is believed that this reduction in temperature can double the effective life of the furnace walls.

Figure 5:
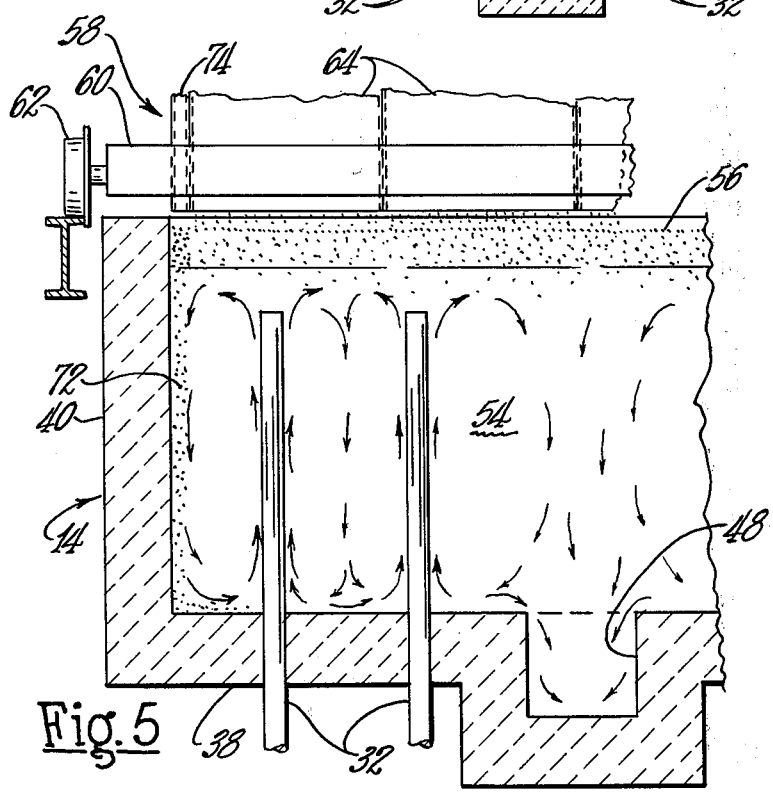
FIG. 5 is an enlarged fragmentary view in transverse cross section of a portion of the furnace of FIG. 4, and showing certain additional details.

As shown in FIGS. 1 and 5, the compound 72 can be added to the edges of the batch layer by narrow compartments 74 added to the ends of the outer hoppers 64 of the distributor 58. The compartments 74 can be either separate, narrow hoppers, or can be formed by baffles in the outer hoppers 64. The compound can be added in undiluted form or can first be mixed with some of the glass batch otherwise used in the furnace. It is also possible to add the compound in the form of cullet which would reduce the batch cover at the edges and increase the heat loss thereat which might further reduce wall temperature to some degree but also reduce the efficiency of the furnace. On the other hand, by adding the absorbing compound with batch, the batch requires more heat to melt than cullet so that this additional heat requirement can help somewhat in reducing wall temperatures.

By way of illustration and not limitation, iron oxide in an amount of one percent by weight of the batch, was added to the batch layer adjacent the side walls in a width or thickness of about one to one and one-half inches projecting from the side walls. FeO is preferred to $Fe_2O_3$ because it absorbs infrared rays somewhat better, although other iron compounds including $Fe_3O_4$ can also be used. The amount employed can range from about one-quarter percent to two percent, by weight, but preferably one-half to one percent. Below one-quarter percent, little effect is achieved, while a quantity exceeding two percent results in no significant improvement. With one percent iron oxide employed, the quantity of iron oxide in the glass discharged from the furnace is less than 0.10 percent and does not affect the characteristics of the glass. As to other substances, almost any coloring compound will have some beneficial effect if it produces a curtain which is darker than the molten glass, but a compound effective to absorb infrared rays is preferred. Other oxides which can be used include those of copper, uranium, cobalt, nickel, vanadium, and certain rare earths. Iron oxides are preferred, however, because they are particularly effective in absorbing rays in the infrared range, need be used in only small quantities, and are inexpensive.

Figure 6:
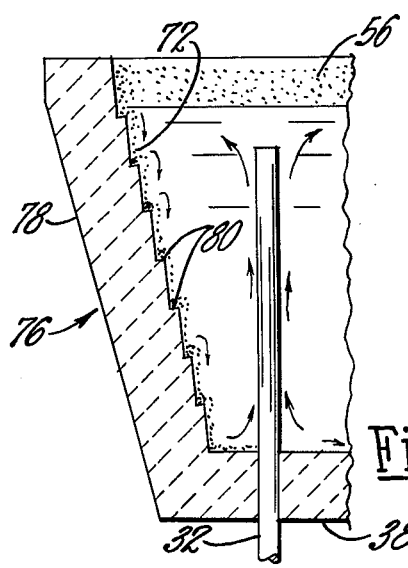
FIG. 6 is a fragmentary view similar to FIG. 5 but showing another embodiment of the invention.

Referring to FIG. 6, a modified furnace embodying the invention is indicated at 76 and is similar to the furnace 10 except for specially designed side walls 78. The side walls 78 slope upwardly and outwardly and have a plurality of steps 80 on the inner surface thereof. The steps 80 tend to collect the compound 72 flowing down the wall and retard the flow of the compound. The slower flow of the compound thus enables less compound to be employed in order to maintain an absorbing curtain between the side wall 78 and the electrode 32. Some flow of the compound 72 is needed, however, to carry away the energy or heat absorbed thereby.

While the invention has been discussed with regard to side walls of the tank, it can be used advantageously with end walls thereof also.

Various modifications of the above described embodiments of the invention will be apparent to those skilled in the art, and it is to be understood that such modifications can be made without departing from the scope of the invention, if they are within the spirit and the tenor of the accompanying claims.

I claim:

1. In a method of operating an electrically heated, melting furnace having a tank formed in part by a wall of refractory, said method including forming a pool of molten material in the tank, adding a layer of batch material to the surface of the pool, and heating the pool internally, the improvement comprising adding an infrared ray absorbing compound to the surface region of the molten material only adjacent the wall to form adjacent the wall a generally vertically curtain-like region of downwardly moving material, such curtain-like region of downwardly moving material having a composition containing at least one-quarter of one percent of such compound and in an amount sufficient to resist the erosive effects on the refractory wall from infrared radiation emitted from within the pool but insufficient to significantly affect the physical characteristics of the molten pool, said compound comprising an oxide selected from the group consisting of copper, uranium, cobalt, nickel, iron and vanadium.

2. The method according to claim 1 characterized further by mixing the infrared ray absorbing compound with glass batch prior to adding the compound to the molten material.

3. The method according to claim 1 characterized further by adding the absorbing compound in an amount sufficient to constitute from one-quarter of one percent to two percent of the downwardly moving material within 1½ inches of the wall.

4. The method according to claim 1 characterized further by adding the absorbing compound in an amount sufficient to constitute from one-half of one percent to one percent of the downwardly moving material within 1½ inches of the wall.

5. In a method of operating an electrically-heated, glass-melting furnace having a tank formed by at least one side wall of refractory and having electrodes extending into the tank, which method comprises forming a pool of molten glass in the tank, and spreading glass batch over the surface region of the molten pool, the improvement comprising adding an infrared ray absorbing material to the pool to form in the pool only between the wall and the electrodes a generally vertical curtain-like region of downwardly moving material containing the infrared ray absorbing material having a greater infrared ray energy absorbing characteristic than the pool, wherein the region of downwardly moving material has a composition consisting of at least one-quarter of one percent of such absorbing material and in an amount sufficient to resist the erosive effects on the refractory wall from infrared radiation.

6. The method according to claim 5 characterized by forming the curtain-like region by adding absorbing material to the surface region of the molten glass adjacent the side wall.

7. The method according to claim 6 characterized further by mixing the absorbing material with glass batch prior to adding the absorbing material of the surface region of the molten glass.

8. The method according to claim 6 characterized further by adding the absorbing material in an amount sufficient to constitute from one-quarter of one percent to two percent of the curtain-like region of downwardly moving material within one and one-half inches of the wall.

9. The method according to claim 6 characterized further by adding the absorbing material in an amount sufficient to constitute from one-half of one percent to one percent of the curtain-like region of downwardly moving material within one and one-half inches of the wall.

10. The method according to claim 6 characterized further by adding the material in an amount sufficient to form such curtain-like region of downwardly moving material in a thickness of one to one and one-half inches.

11. The method according to claim 5 characterized by moving the material of the region relative to the side wall.

12. The method according to claim 11 characterized by moving the material downwardly along the side wall.

13. The method of making glass which comprises feeding batch onto the surface of a pool of molten glass in a furnace having at least one wall of refractory and melting the batch to add to the pool, discharging glass of the pool from the furnace through an opening, altering the composition of the glass in the pool along a wall of the furnace by adding a second batch material to form a generally vertical layer of downwardly moving material along said wall containing an infrared ray absorbing material having a greater infrared ray energy absorbing characteristic than the pool, wherein the region of downwardly moving material consists of at least one-quarter of one percent of such absorbing material and in an amount sufficient to resist the erosive effects on the refractory wall from infrared radiation emitted from within the pool but insufficient to adversely affect the characteristics of the discharged glass.

14. A method of melting glass which comprises feeding batch onto the surface of a pool of molten glass in a furnace having a wall of refractory and melting the batch to add to the pool, discharging glass of the pool from the furnace through an opening, altering the composition of the glass in the pool along the wall of the tank by continually adding an oxide selected from the group consisting of copper, uranium, cobalt, nickel, iron, and vanadium to the batch of the molten glass to form a generally vertical layer of downwardly moving infrared-ray absorbing material along said walls wherein such curtain-like region of downwardly moving material contains at least one-quarter of one percent of such oxide and in an amount sufficient to resist the erosive effects on the refractory wall from infrared radiation emitted from within the pool.

* * * * *